3,222,379
CYCLIC DERIVATIVES OF ARYLBORONIC ACIDS AND OF 1,2- AND 1,3-DIOLS AND PROCESS FOR PREPARING SAME
Jean-Marie Farthouat, Romainville, France, assignor, by mesne assignments, to Roussel-UCLAF, S.A., Paris, France, a corporation of France
No Drawing. Filed Dec. 14, 1960, Ser. No. 75,678
7 Claims. (Cl. 260—340.9)

The present invention relates to the preparation of cyclic derivatives of arylboronic acids whose structure is represented by the general formula $$Ar-B\begin{matrix}O-C\\ \\O-C\end{matrix}\begin{matrix}V\\ \\ \\ \wedge\end{matrix}(C<)_n \quad (I)$$

wherein Ar is an aryl radical which may be substituted or unsubstituted, $n$ is equal to 0 or 1, and wherein the free valences of the carbon atoms carry either hydrogen or organic radicals.

Derivatives (I) result from the condensation of arylboronic acids $$Ar-B\begin{matrix}OH\\ \\OH\end{matrix}$$

with 1,2- and 1,3-diols, and preferably with diols of said type possessing physiologic properties, since the properties are magnified by the arylboronic acids, so that the corresponding derivatives (I) constitute therapeutic substances of great interest.

In the copending application No. 821,653, now Patent 3,038,926 the applicant has described compounds within the scope of general formula (I) together with a process for their preparation, said process comprising condensing the arylboronic acid with the 1,2- or 1,3-diol by heating the reactants in anhydrous medium, the pH value being that of the reaction medium. The process is based on the apparent structure of the derivatives (I) and on the procedure used for their formation, both facts leading quite naturally to consider these compounds cyclic diesters of arylboronic acids and of diols, to which the conventional conditions of esterification apply.

A thorough study of the chemical properties and of the structure of the derivatives (I), however, has shown that the latter should rather be considered as heterocyclic boron derivatives, that is, dioxaborolanes ($n=0$) or dioxaborinanes ($n=1$).

This fact results, on the one hand, from the very great stability of these compounds towards hydrolysis. Indeed, it is well known that boronic esters, generally, are on the contrary very readily hydrolyzable products, and that mere exposure to atmospheric humidity is often sufficient to effect the separation into boric acid and alcohol.

It has been found, on the other hand, that when a 1,2- or a 1,3-diol is added to an aqueous alkaline solution of an arylboronic acid, the diol dissolves progressively even if originally water-insoluble.

Subsequent acidification of the resultant solution leads to a derivative (I), which shows that the latter compound has been formed within the alkaline medium.

Therefore, this formation procedure leads to considering the derivatives (I) rather as heterocyclic boron derivatives than as esters.

This finding is the basis for the new process for the preparation of derivatives (I) which is the object of the present invention. Said process comprises condensing an arylboronic acid having the formula $$Ar-B\begin{matrix}OH\\ \\OH\end{matrix}$$

wherein Ar has the hereinbefore given meaning, in the presence of an alkaline solution, and subsequently acidifying the reaction medium in order to precipitate out the desired compound.

The alkaline solution may be a solution of a strong organic or mineral base in water, in an organic solvent, or in a mixture of both.

Various embodiments of the process may be used within the above mentioned scope.

In an embodiment of the process, an alkaline solution of arylboronic acid is prepared by dissolving it in excess aqueous solution of sodium or potassium hydroxide; the diol is added preferably in stoichiometric ratio, and starring is carried out to complete dissolution. The resultant compound is then precipitated with an acid; it is sucked almost dry, dried, and purified by recrystallization from an appropriate solvent.

In other embodiments according to the process, both constituents are mixed together before treatment with an alkaline solution; the procedure is carried out at room temperature, or above, as the case may be; the diol, or the acid, or both are dissolved in an appropriate solvent prior to being carried in alkaline medium. The reaction is carried out in the presence of sodium or potassium hydroxide, or in the presence of any other mineral or organic base insuring a sufficiently alkaline pH to the reaction medium so that the reactants will dissolve. The alkaline solutions employed may be purely aqueous, aqueous-alcoholic, or alcoholic, or obtained with any other appropriate solvents or mixture thereof.

The following examples are given merely for illustrative purposes, and the scope of the present invention is not to be limited thereto. The melting points given are the instantaneous melting points determined on a Maquenne block.

The compounds prepared according to the examples, and this is true generally of the derivatives (I), offer, with respect to the constituents from which they have been obtained, properties which are often very advantageous. Thus, the solubilities of the condensation products are, generally, much weaker than the solubilities of the original materials; also, their pharmacodynamic properties are more powerful or more subtle, and they have less toxicity.

EXAMPLE I

*2-p-tolyl-5-methyl-5-n-propyl-1,3,2-dioxaborinane*

13 g. of p-tolylboronic acid are dissolved in a solution containing 10 g. of caustic soda and 100 ml. of water. 13.2 g. of 2-methyl-2-n-propyl-1,3-propanediol are dissolved in 200 ml. of water. The two solutions are then mixed and, after a few moments the resultant solution is acidified with hydrochloric acid to pH 6. The product precipitates out in crystalline form; it is then sucked almost dry, dried, and recrystallized from ethanol. Melting point 54° C. Yield 95%.

EXAMPLE II

*2-p-tolyl-4-o-toloxymethyl-1,3,2-dioxaborolane*

7.47 g. of p-tolylboronic acid are dissolved in 750 ml. of aqueous N-potassium hydroxide solution: 10 g. of cresoxypropane-diol are then added, with vigorous stirring. When dissolution is complete, the mixture is acidified with hydrochloric acid to pH 7. The product precipitates out as an oil which soon sets to a mass. This is sucked almost dry, dried, and recrystallized from hexane. Colourless crystals. Melting point 42° C. Yield 70%.

EXAMPLE III

*2,1-cis-p-tolyl-4-paranitrophenyl-5-dichloroacetamido-1,3,2-dioxaborinane*

15.2 g. of powdered chloramphenicol are added portionwise, with vigorous stirring, to a solution containing 6.4 g. of p-tolylboronic acid in 50 ml. of normal potassium hydroxide and heated to a temperature of 60° C. The chloramphenicol thus added dissolves little by little. When dissolution is complete, the resultant solution is allowed to cool; it is then acidified with dilute sulphuric acid to pH 7. The product precipitates out in the form of fine colourless, or slightly cream-coloured crystals. These are sucked almost dry, dried and recrystallized from methanol. Colourless crystals. Melting point 177–178° C. Yield 80%.

EXAMPLE IV

*2-p-carboxyphenyl-5-methyl-5-n-propyl-1,3,2-dioxaborinane*

A solution containing 20 g. of 2-methyl-2-n-propyl-1.3-propanediol and 300 ml. of water is added to a solution made of 16.6 g. of p-carboxyphenylboronic acid in 150 ml. of 2 N sodium hydroxide. The resultant solution is stirred for a few moments; it is then acidified with hydrochloric acid to pH 2. The product precipitates out in the form of colourless crystals. These are sucked almost dry, dried, and recrystallized from methanol. Melting point 218–220° C. Yield 80%.

EXAMPLE V

*2-p-carboxyphenyl-4-p-chlorophenyl-4,5,5,-trimethyl-1,3,2-dioxaborolane*

A solution containing 2.6 g. of 2-p-chlorophenyl-3-methyl-2,3-butanediol in 50 ml. of methanol is slowly added with vigorous stirring, to a solution made of 2 g. of p-carboxy-phenylboronic acid in 20 ml. of 2 N potassium hydroxide. When the addition is complete, stirring is continued until a perfectly clear solution is obtained. The resultant solution is then acidified with hydrochloric acid to pH 2. The product precipitates out as an oil which is taken up in a boiling hexane-cyclohexane mixture. The product crystallizes out on cooling. Colourless crystals. Melting point 175–178° C. Yield 50%.

EXAMPLE VI

*2-p-carboxyphenyl-4-o-toloxymethyl-1,3,2-dioxaborolane*

A solution containing 10.9 g. of 1-o-cresoxy-propane-2,3-diol and 40 ml. of methanol is added to a solution made of 10 g. of p-carboxyphenylboronic acid in 50 ml. of 2.5 N sodium hydroxide. After stirring for a few moments, the methanol is distilled off under reduced pressure. The resultant solution is acidified with hydrochloric acid to pH 2. The product precipitates out in the form of colourless crystals. These are sucked almost dry, dried and recrystallized from methanol. Colourless crystals. Melting point 210–211° C. Yield 80%.

EXAMPLE VII

*16α,17α-p-tolylborondioxy-9α-fluoro-11β,21-dihydroxy-1,4-pregnadiene-3,20-dione*

9.85 mg. of 9α-fluoro-11β,16α,17α-21-tetrahydroxy-1,4-pregnadiene-3,20-dione (triamcinolone) are added with vigorous stirring to a solution containing 3.61 mg. of p-tolylboronic acid and 2 ml. of N/10 sodium hydroxide, and dissolve little by little. The resultant solution is then filtered, and acidified with hydrochloric acid. The product precipitates out in the form of colourless crystals which are recrystallized from an alcohol-water mixture. Melting point 200–210° C. Yield 50%.

EXAMPLE VIII

*p-Tolylborondioxy-glucochloralose*

2.34 g. of chloralose are added, with vigorous stirring, to a solution containing 1 g. of p-tolylboronic acid in 16 ml. of N-sodium hydroxide, and dissolved little by little. The resultant solution is acidified with hydrochloric acid to pH 1. The product precipitates out in the form of colourless crystals. Melting point 95° C.

It is to be understood that the present invention is not to be restricted to the embodiments described which have been given merely for illustrative purposes.

Having now described my invention what I claim as new and desire to secure by Letters Patent is:

1. Process for the preparation of organic boron derivatives selected from the group consisting of the arylborolanes having the general formula:

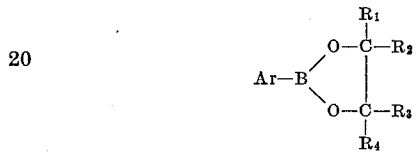

and the aryloborinanes having the general formula:

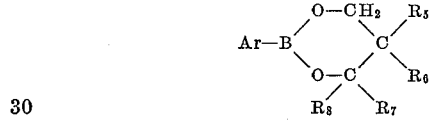

in which formulae Ar is a radical selected from the group consisting of the phenyl, tolyl and carboxyphenyl groups, $R_1$, $R_2$, $R_3$ and $R_4$ are each a radical selected from the group consisting of hydrogen, lower alkyl, tolyloxy lower alkyl, phenyl and monochloro-substituted phenyl groups and, when taken together and with the —O—C groups to which they are attached, form the residue of a compound selected from the group consisting of the 16,17-dihydroxy steroids of the pregnadiene series and the vicinal diols of the glucose series, and $R_5$, $R_6$, $R_7$ and $R_8$ are each selected from the group consisting of hydrogen, lower alkyl, phenyl, mononitro-substituted phenyl and α-substituted acetamido groups, said process comprising condensing, in an alkaline reaction medium, an arylboronic acid having the formula:

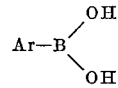

with a diol selected from the group consisting of 1,2-diols having the general formula:

and 1,3-diols having the general formula:

Ar, $R_1$, $R_2$, $R_3$, $R_4$, $R_5$, $R_6$, $R_7$ and $R_8$ havng the aforementioned meanings, and subsequently acidifying the reaction medium, thereby precipitating said organic boron derivative and recovering said derivative.

2. Process for the preparation of organic boron derivatives selected from the group consisting of the arylborolanes having the general formula:

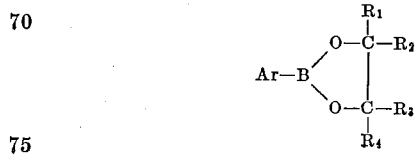

and the arylborinanes having the general formula:

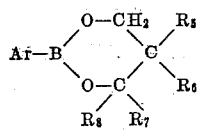

in which formulae Ar is a radical selected from the group consisting of the phenyl, tolyl and carboxyphenyl groups, $R_1$, $R_2$, $R_3$ and $R_4$ are each a radical selected from the group consisting of hydrogen, lower alkyl, tolyloxy lower alkyl, phenyl and monochloro-substituted phenyl groups and, when taken together and with the —O—C groups to which they are attached, form the residue of a compound selected from the group consisting of the 16,17-dihydroxy steroids of the pregnadiene series and the vicinal diols of the glucose series, and $R_5$, $R_6$, $R_7$ and $R_8$ are each selected from the group consisting of hydrogen, lower alkyl, phenyl, mononitro-substituted phenyl and α-substituted acetamido groups, said process comprising adding a diol selected from the group consisting of 1,2-diols having the general formula:

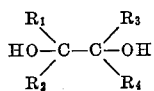

and 1,3-diols having the general formula:

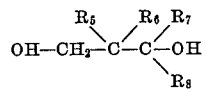

to an alkaline solution of an arylboronic acid having the formula

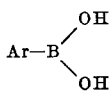

Ar, $R_1$, $R_2$, $R_3$, $R_4$, $R_5$, $R_6$, $R_7$ and $R_8$ having the aforementioned meanings, and subsequently acidifying the reaction medium to precipitate out said organic boron derivative and recovering said derivative.

3. Process for the preparation of organic boron derivatives selected from the group consisting of the arylborolanes having the general formula:

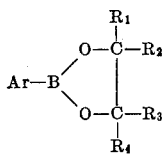

and the arylborinanes having the general formula:

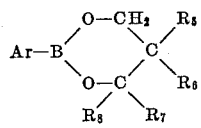

in which formulae Ar is a radical selected from the group consisting of the phenyl, tolyl and carboxyphenyl groups, $R_1$, $R_2$, $R_3$ and $R_4$ are each a radical selected from the group consisting of hydrogen, lower alkyl, tolyloxy lower alkyl, phenyl and monochloro-substituted phenyl groups and, when taken together and with the —O—C groups to which they are attached, form the residue of a compound selected from the group consisting of the 16,17-dihydroxy steroids of the pregnadiene series and the vicinal diols of the glucose series, and $R_5$, $R_6$, $R_7$ and $R_8$ are each selected from the group consisting of hydrogen, lower alkyl, phenyl, mononitro-substituted phenyl and α-substituted acetamido groups, said process comprising mixing an aqueous solution of a diol selected from the group consisting of 1,2-diols having the general formula:

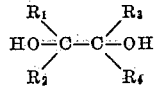

and 1,3-diols having the general formula:

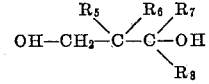

with an alkaline solution of an arylboronic acid having the formula

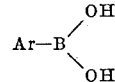

Ar, $R_1$, $R_2$, $R_3$, $R_4$, $R_5$, $R_6$, $R_7$ and $R_8$ having the aforementioned meanings, and subsequently acidifying the reaction medium to precipitate out said organic boron derivative and recovering said derivative.

4. Process as claimed in claim 3, wherein said aqueous solution of the diol further contains as co-solvent an alcohol.

5. Process for the preparation of organic boron derivatives selected from the group consisting of the arylborolanes having the general formula:

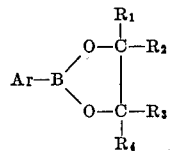

and the arylborinanes having the general formula:

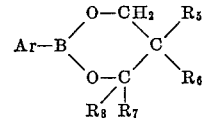

in which formulate Ar is a radical selected from the group consisting of the phenyl, tolyl and carboxyphenyl groups, $R_1$, $R_2$, $R_3$ and $R_4$ are each a radical selected from the group consisting of hydrogen, lower alkyl, tolyloxy lower alkyl, phenyl and monochloro-substituted phenyl groups and, when taken together and with the —O—C groups to which they are attached, form the residue of a compound selected from the group consisting of the 16,17-dihydroxy steroids of the pregnadiene series and the vicinal diols of the glucose series, and $R_5$, $R_6$, $R_7$ and $R_8$ are each selected from the group consisting of hydrogen, lower alkyl, phenyl, mononitro-substituted phenyl and α-substituted acetamido groups, said process comprising condensing at room temperature in an alkaline aqueous medium an arylboronic acid having the formula

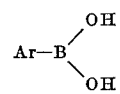

with a diol selected from the group consisting of 1,2-diols having the general formula:

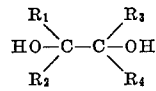

and 1,3-diols having the general formula:

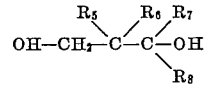

Ar, $R_1$, $R_2$, $R_3$, $R_4$, $R_5$, $R_6$, $R_7$ and $R_8$ having the aforementioned meanings, and subsequently acidifying the reaction medium, thereby precipitating said organic boron derivative and recovering said derivative.

6. Process as claimed in claim 1, wherein the alkalinity of said reaction medium is obtained by means of a strong base selected from the group consisting of organic and mineral bases.

7. Process as claimed in claim 1, wherein said alkaline reaction medium is an aqueous medium.

References Cited by the Examiner

UNITED STATES PATENTS 2,831,003    4/1958   Thomas _____ 260—462
3,005,839   10/1961   Leeson et al. _____ 260—397.45

OTHER REFERENCES

Kuivila et al.: "J. Org. Chem.," vol. 19, pages 780–3 (1954).

Sugihara et al.: "J. Am. Chem. Soc.," vol. 80, pages 2443–2446 (1958).

The Merck Index, sixth ed., pages 223–224.

Torssell: "Technical Translations," vol. 1, page 312 (1959).

LEWIS GOTTS, *Primary Examiner.*

DUVAL T. McCUTCHEN, *Examiner.*